United States Patent
Konradi et al.

(10) Patent No.: US 9,235,400 B2
(45) Date of Patent: Jan. 12, 2016

(54) METHOD FOR OPERATING A CONTROL DEVICE FOR CONTROLLING A TECHNICAL INSTALLATION

(71) Applicants: Philipp Konradi, Knoxville, TN (US);
Stefan Nitzsche, Frankenthal (DE);
Holger Strobel, Steinbach (DE)

(72) Inventors: Philipp Konradi, Knoxville, TN (US);
Stefan Nitzsche, Frankenthal (DE);
Holger Strobel, Steinbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/025,505

(22) Filed: Sep. 12, 2013

(65) Prior Publication Data
US 2014/0082600 A1 Mar. 20, 2014

(30) Foreign Application Priority Data
Sep. 19, 2012 (EP) .................................. 12185066

(51) Int. Cl.
*G06F 9/44* (2006.01)
*G06F 9/445* (2006.01)
*G05B 19/042* (2006.01)

(52) U.S. Cl.
CPC .............. *G06F 8/65* (2013.01); *G05B 19/0426* (2013.01); *G05B 2219/23333* (2013.01); *G05B 2219/23334* (2013.01); *G05B 2219/31418* (2013.01); *G06F 8/20* (2013.01); *G06F 8/30* (2013.01); *G06F 8/67* (2013.01); *G06F 8/68* (2013.01); *G06F 8/71* (2013.01)

(58) Field of Classification Search
CPC ............... G06F 8/20; G06F 8/30; G06F 8/65; G06F 8/67; G06F 8/68; G06F 8/71
See application file for complete search history.

(56) References Cited

U.S. PATENT DOCUMENTS 5,734,899 A * 3/1998 Yoshizawa et al. ........... 715/804
7,913,246 B2 * 3/2011 Hammond et al. ........... 717/173
(Continued)

FOREIGN PATENT DOCUMENTS

WO    WO 2007109717 A2    9/2007

OTHER PUBLICATIONS

Kezunovic et al., "Automated Monitoring and Control Using New Data Integration Paradigm", 38th Annual Hawaii International Conference on Systems Science, Waikoloa, HI, Jan. 5-8, 2005, pp. 1-10; <http://citeseerx.ist.psu.edu/viewdoc/download?doi=10.1.1.99.9069&rep=rep1&type=pdf>.*

(Continued)

*Primary Examiner* — Thuy Dao
*Assistant Examiner* — Ben C Wang
(74) *Attorney, Agent, or Firm* — Cozen O'Connor

(57) ABSTRACT

A method for operating first or second control devices for controlling a technical installation with control data stored on a data medium in a predetermined format, wherein the control data is stored on the data medium in a first format such that this data can be processed directly for read/write operations by the first control device, during operation of the second control device first control data is converted into a second format such that the converted first control data can be processed directly for read/write operations by the second control device, and where second control data is converted during each access at runtime from the first format into a format that can be processed by the second control device, or the first control data is converted during each access at runtime from the second format into a format that can be processed by the first control device.

11 Claims, 5 Drawing Sheets

(56) References Cited

U.S. PATENT DOCUMENTS

| | | | | |
|---|---|---|---|---|
| 8,055,727 | B2* | 11/2011 | Cahill et al. | 709/218 |
| 8,930,934 | B2* | 1/2015 | Maynard et al. | 717/171 |
| 2004/0240408 | A1* | 12/2004 | Gur | 370/328 |
| 2005/0159856 | A1* | 7/2005 | Daghan et al. | 701/1 |
| 2007/0067725 | A1* | 3/2007 | Cahill et al. | 715/733 |
| 2007/0130184 | A1* | 6/2007 | Hogg | 707/101 |
| 2007/0226685 | A1* | 9/2007 | Kaakani et al. | 717/108 |
| 2008/0059979 | A1* | 3/2008 | Hashimoto et al. | 719/321 |
| 2008/0244196 | A1* | 10/2008 | Shitomi et al. | 711/147 |
| 2009/0006727 | A1* | 1/2009 | Odira | 711/103 |
| 2009/0182715 | A1* | 7/2009 | Falkenberg | 707/3 |
| 2009/0183219 | A1* | 7/2009 | Maynard et al. | 717/173 |
| 2009/0225597 | A1* | 9/2009 | Shin et al. | 365/185.05 |
| 2010/0146498 | A1* | 6/2010 | Davies | 717/174 |
| 2010/0161666 | A1* | 6/2010 | Do et al. | 707/791 |
| 2012/0065810 | A1* | 3/2012 | Narisawa et al. | 717/104 |
| 2012/0117152 | A1* | 5/2012 | Falkenberg | 709/204 |
| 2012/0216183 | A1* | 8/2012 | Mahajan et al. | 717/170 |

OTHER PUBLICATIONS deVos et al., "XML for CIM Model Exchange", 2001 IEEE, pp. 31-37; <http://ieeexplore.ieee.org/stamp/stamp.jsp?tp=&arnumber=932315>.*

Karvounarakis et al., "Collaborative Data Sharing via Update Exchange and Provenance", ACM, Aug. 2013, <http://dl.acm.org/results.cfm?h=1&cfid=710114260&cftoken=12734224>.*

* cited by examiner

METHOD FOR OPERATING A CONTROL DEVICE FOR CONTROLLING A TECHNICAL INSTALLATION

BACKGROUND OF THE INVENTION

1. Field of the Invention

The invention relates to a method for operating a first or a second control device, which particularly serves to control a technical installation, where the operation of the first or second control device is undertaken with control data stored on a data medium in a predetermined format.

2. Description of the Related Art

The control devices, also comprising in some cases mobile devices, represent a human-machine interface (HMI) for controlling a technical installation. A control computer of the technical installation can be controlled via the control devices. To this end, the control devices have appropriate input and output means via which the technical installation can be observed, operated and controlled.

The functionalities of the control device are ensured with control data stored on a data medium. In the event of a technical defect of the control device, the data medium with the control data can then be removed from the defective control device and inserted into another control device. After the control data has been read out from the data medium, it is possible to control the technical installation with the new control device.

Although keeping the control data on the data medium allows rapid replacement of the control device, reading out and processing the control data stored on the data medium can be problematic with different versions of the control devices. Newer versions, especially of software, of the control devices frequently contain new features or changes to the existing features, which both frequently have an effect on the processing of the control data, such as through a changed data format.

Even if the control device can read out and process the control data stored on the data medium with a more up-to-date (software) version, a modification of the control data stored on the data medium can occur during the operation of the newer control device. After the data medium is replaced in a control device of the old version, under some circumstances it is no longer possible to read out the control data without problems.

In principle, it is known that control devices can be equipped with a newer version, i.e., newer software, such that this processes control data present in the "old format" on the data medium. The old format of the control data is preserved here both during reading and also during writing of data. This first-mentioned variant, in addition to a greater complexity of the software of the newer control device, leads to a deterioration of the qualitative properties during the operation of the new control device. For example, a longer start-up time, a longer time needed for the execution of operations and a higher use of resources occur. The more the new data format differs from the old data format, the greater are the negative effects.

As an alternative, the control data contained on the data medium can be adapted to the newer software version of the more up-to-date control device. To this end, the newer control device converts the control data into an optimal format for the software. At the same time, the control device with the older version, i.e., older software, must be expanded by the option for processing the control data present in the new data format on the data medium. This variant demands an expansion of the software of the old control device. If the control devices are used in safety-oriented installations, then any expansion of the functionality is to be verified by an assessor. This is complex and associated with high costs. In addition, the interaction of the first control device with such control devices as are compatible with the first control devices can no longer be guaranteed under some circumstances.

SUMMARY OF THE INVENTION

It is therefore an object of the present invention to provide a method with which an exchange of control data between control devices with different software versions can be ensured in a simpler way.

This and other objects and advantages are achieved in accordance with the invention by providing a method for operating a first or a second control device which especially serves to control a technical installation with control data stored in a predetermined format on a data medium. The control data is stored on the data medium in a first format, so that the data can be processed directly for reading and/or writing by the first control device. Immediate processing of data is to be understood as processing without further intermediate steps, such as conversion. The control data stored in the first format on the data medium can, for example, be data in an "old format" which can be processed by a first "old type" control device or by an "old software version".

The control data comprises first and second control data. During operation of the second control device, the first control data is converted into a second format so that the converted first control data can be directly processed by the second control device for reading and/or writing. Conversely the second control data is converted for each access at runtime from the first format into a format that can be processed by the second control device or from the second format into a format that can be processed by the first control device.

The method in accordance with the invention represents a combination of the "preservation of an old format" and the "conversion into a new format". This, for example, makes possible the use of new control devices as replacements and the subsequent replacement of the data medium in older control devices. At the same time, the disadvantages described above in performance and in rapid start-up of the control devices are avoided. This results in greatly simplified logistics for the installation operator, precisely for control devices held in stock as replacement devices. Thus, for example, the version of a control device precisely matching the technical installation no longer has to be held in stock.

In addition, the form of collaboration with other components is possible, for which control data stored on the data medium is directly exchanged. Such an exchange can, for example, be undertaken through a transfer via external data media, transfer via networks, with a folder enabled in the network or an access to files via a network server.

The first control data is converted once into the second format. This enables the computing outlay for the conversion to be kept small.

The first control data converted into the second format is stored on the data medium. In particular, the first control data converted into the second format is stored in addition to the first control data stored on the data medium in the first format. This makes it possible to optionally use the data medium with the control data in the first or the second control device.

The first control data converted into the second format can be stored in another file or in another folder or in another memory area that is different than the control data present in the first format. The control data present in the first format thus remains unaffected by the conversion of the first control data into the second format. This ensures that after use of the data medium which now includes the first control data in the second format as well as the first control data in the second format, a first control device can continue to read from or write to the data medium without problems. This ensures backwards compatibility from the second to the first control device.

In a further embodiment, the first control data is converted by the second control device. This can be done, for example, directly after the first reading of the control data contained on the data medium by the second control device. Likewise, the conversion can be undertaken directly after the insertion of the data medium into a read device of the second control device. Since, as described, the conversion only takes place once, the device can work thereafter directly with the control data contained on the data medium.

The first and the second control data are preferably of different types. Preferably, the first control data contains such data to which there is predominantly read access during the operation of the first and second control device. Predominantly read access can be understood, for example, as a read access of more than 80% of overall access to the data. This means that more than 80% of the data is read and less than 20% is changed by writing.

By contrast, the second control data comprises dynamically-changeable data during operation of the first or second control device. The data is dynamic in the sense of the invention if constant or frequent changes occur during regular operation of the control device and, e.g., more than half of the accesses to the data are of a write nature.

In accordance with a further embodiment, a write access to the first control data includes writing the first control data present in the first and second format. The first control data present in the second format is written directly. The first control data present in the first format is written into the first format after a conversion has occurred from the format able to be processed by the second control device. This ensures that, with a write access to the first control data, the changes are present both in the first and also in the second data format. This ensures that, even with the modification of the first control data by the second control device, the use of the data medium with the control data located thereon by the first control device continues to be possible and said device can operate with current data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below with reference to an exemplary embodiment in the drawing, in which.

DETAILED DESCRIPTION OF THE PREFERRED EMBODIMENTS

When this description refers to a first or a second control device, then this is to be understood as a control device of a first or a second type. When the description refers to a new or a newer control device or to a new or newer version of the control device, this is to be understood as a control device with different or newer software compared to an old or older control device. It should also be understood that the hardware does not have to be identical.

Figure 1:
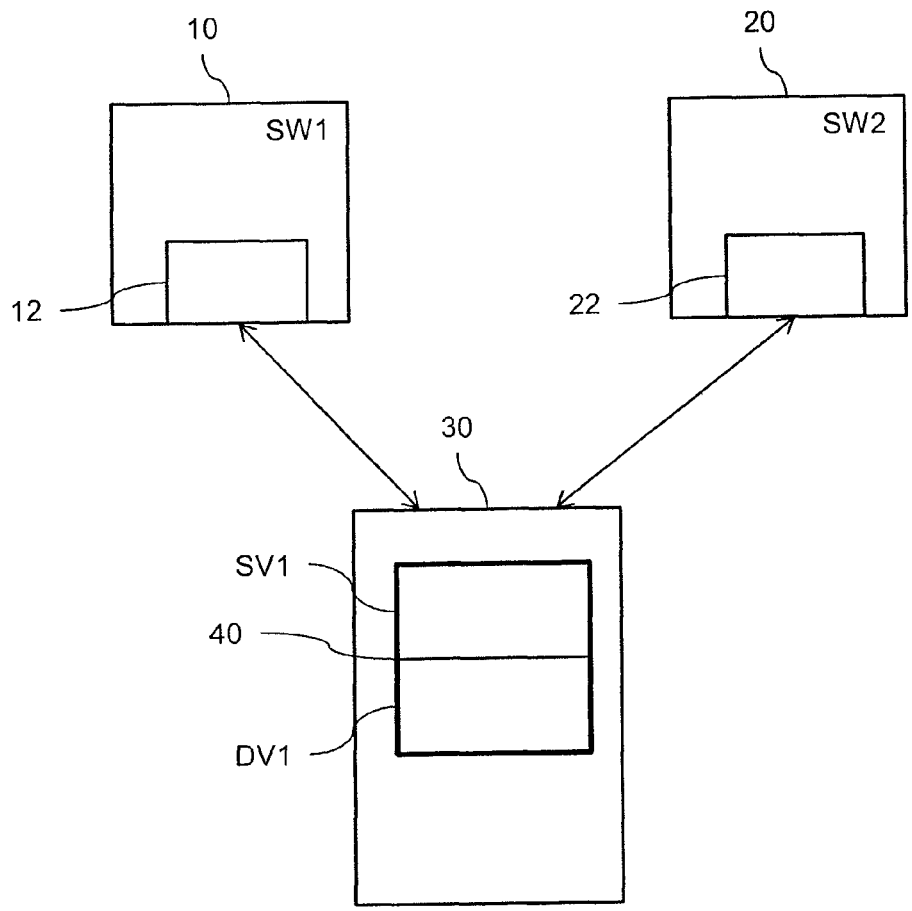
FIG. 1 shows a schematic diagram of a data medium with control data stored in a predetermined format, which is useable to operate a first or a second control device.

FIG. 1 shows a greatly simplified diagram of a first and a second control device 10, 20, which each have a read device 12 or 22 respectively for receiving a data medium 30 described below in greater detail. The data medium 30 includes control data 40, with which a technical installation (not shown) can be operated, controlled and observed via the control device 10, 20 containing the data carrier 30. While the first control device 10 is equipped with first software SW1, the second control device 20 has second software SW2 with changed, e.g., newer, functionality compared to the first software SW1. The different software versions of the first and second control device 10, result in the data structure of the control data processed by the respective control devices 10, 20 being different.

Figure 4:
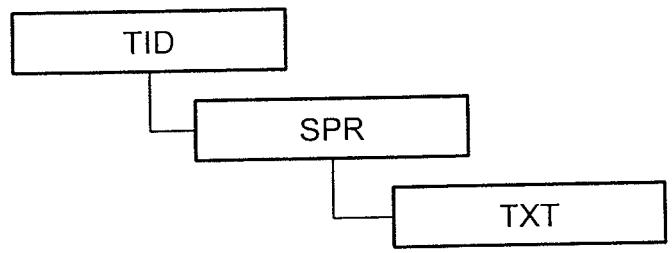
FIG. 4 shows a typical data structure of first control data in a first format which can be processed by the first control device.
Figure 6:
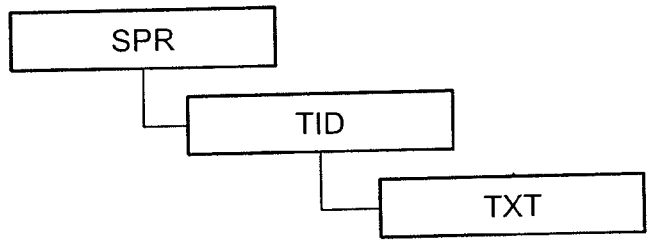
FIG. 6 shows a typical data structure of first control data in a second format which is able to be processed by the second control device.

For example, texts localized in a number of languages are structured and processed in the data format depicted in accordance with FIG. 4 by the control device 10 with the first software SW1. Starting from a text ID, i.e., a text identifier TID, first a language SPR and then a text TXT are processed. By comparison, the data structure processed by the second software SW2 of the second control device is structured for reasons of performance in accordance with FIG. 6. Here, processing is dependent on a language SPR of the text identifier TID and the text TXT. The result of this is that the control data 40 contained on the data medium 30 in FIG. 1 must be present in a different form for processing by the different control devices 10, 20.

In the initial situation shown in FIG. 1, the control data 40 is present in a first format that can be processed directly by the first control device 10. Immediate processing of data is to be understood as processing without further intermediate steps, such as conversion. The data structure of the control data is thus adapted to the first control device. The control data 40 is divided into first control data SV1 and second control data DV1. The index "1" signals in this case that control data of the first format is involved here.

Although the first and second control data SV1, DV1 are shown in the first format in FIG. 1 as two data blocks separated from one another, this is not necessary in practice. The data of the control data 40 can be divided into first or second control data SV1, DV1 based on its type. All such control data as is of a statistical nature and thus is never changed or is only rarely changed is assigned to the first control data SV1. By contrast, dynamic, rapidly-changing data of the control data 40, which is frequently changed during processing by the first control device 10, is assigned to the second control data DV1.

Static data, i.e., first control data, is data such as texts, pictures, diagrams, which primarily serve for visualization to a user of the control device via a human-machine interface. Dynamic control data, on the other hand, is data such as alarms and/or (current or historical) process values which can be frequently changed during the operation of the first control device 10. Based on their different types, it is therefore readily possible to assign the control data to the first or the second control data SV1 or DV1. Storing the data in corresponding data blocks is not necessary.

In the event of a defect of the first operating device 10, the data medium 30 can be removed from the read device 12 of the first control device 10 and inserted into the read device 22 of the second control device 20. Because of the software version SW2 changed in relation to the first software SW1, direct processing of the first and second control data SV1, DV1 is either not possible or is associated with high performance losses. In order to make the processing of the control data 40 with higher performance possible, but at the same time to also ensure a backward compatibility of the control data 40 to the first software SW1, the first control data SV1 in the first format is converted by the second control device 20 into the second format SV2. As a result, the first control data SV2 in the second format can be read and/or written directly by the second control device 20.

Figure 2:
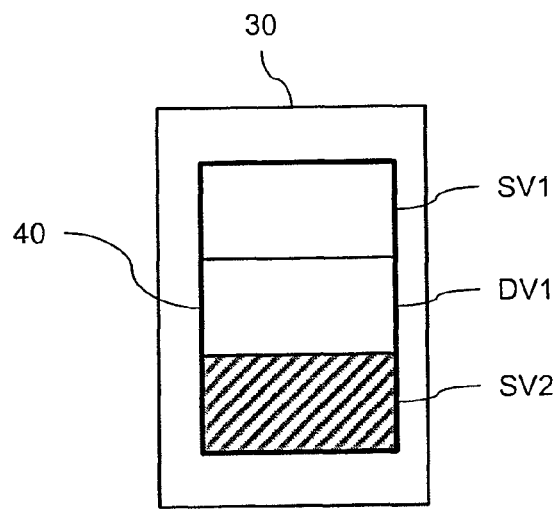
FIG. 2 shows the data medium of FIG. 1 with the control data stored thereon after use in the second control device.

During the conversion, the first control data SV1 in the first format is not overwritten here, but the converted first control data SV2 is additionally stored on the data medium 30 by the second control device 20. The conversion of the first control data SV1 in the first format can, for example, be undertaken after the first readout of the first control data SV1 located on the data medium 30. The data structure produced after the conversion process is shown in FIG. 2. It can readily be seen from this figure that in addition to the first control data SV1 in the first format and the second control data DV1 in the first format, the converted first control data SV2 is contained in the second format. Here, the index "2" specifies the presence of the first control data SV in the second format. This data is also shown cross-hatched.

The advantage of this process lies in the second software SW2 of the second control device being able to exclusively use the working copy of the data in the new format for access to the first control data SV2. The possibility of directly processing the first control data SV2 enables the performance of the second control device to be kept as a high level. The first control data predominantly comprises data of a static nature. As a result, modifications also seldom have to be undertaken on the first control data, which also benefits performance. By contrast, the second software SW2 is configured to process the dynamic, rapidly changing second control data DV1 by corresponding conversion into a format that can be processed by the second software SW2. This means that each read and write access is associated with a conversion.

Figure 3:
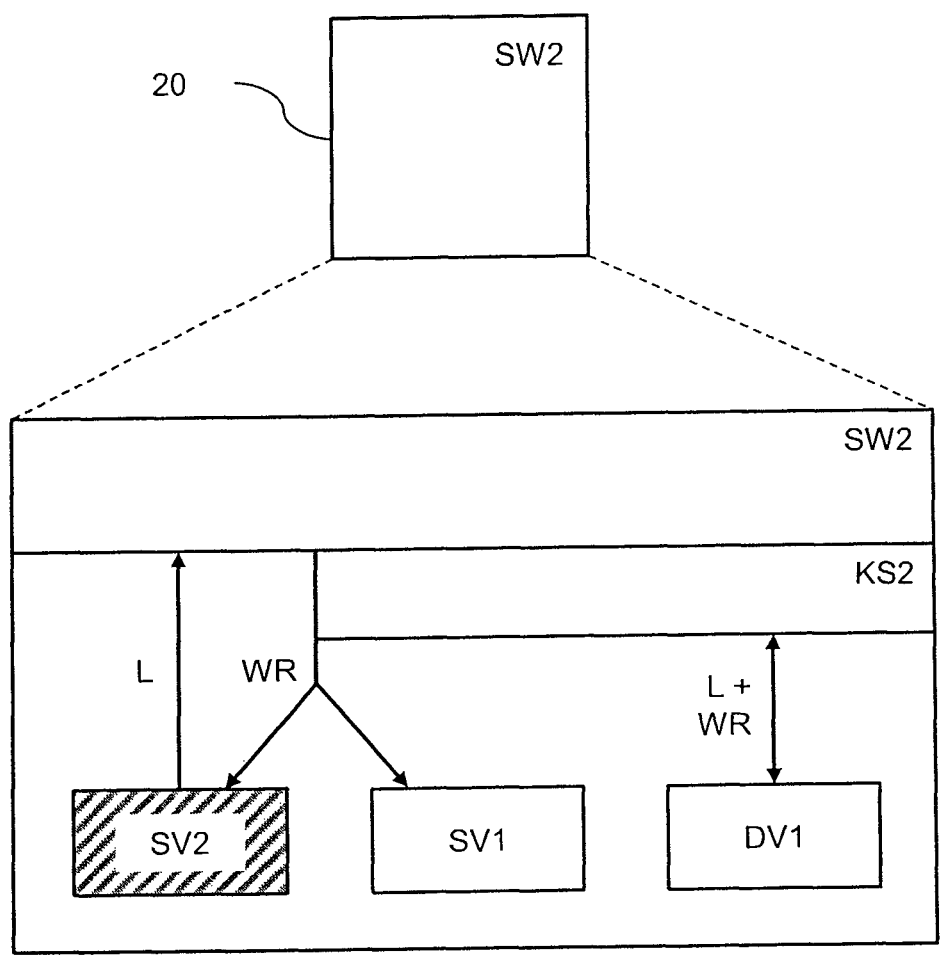
FIG. 3 shows a schematic diagram of the processing of the control data by the second control device.

The mode of operation of the second control device 20 with the second software SW2 is shown again schematically in FIG. 3. Contained in the second software SW2 is a conversion layer KS2 or it is contained in the layer in addition to the second software SW2. The conversion layer KS2 serves to make possible read and write processes (L+WR) to the second control data DV1 of the data medium 30. Here a conversion of the data format of the second control data DV1 on the data medium 30 into a data format used by the software SW2 and vice versa is undertaken. If, on the other hand, first control data is processed, then there can be directed read access to the converted first control data SV2. For the few cases in which the first control data must be modified by the second software SW2 of the second control device 20, a modification is undertaken both of the converted first control data SV2 and also of the non-converted first control data SV1 used by the first control device. The write process into the converted first control data SV2 can be undertaken directly here, i.e., without conversion. The write process which relates to the first control data SV1 of the first format, is undertaken by the conversion layer KS2 by carrying out a corresponding conversion.

Figure 5:
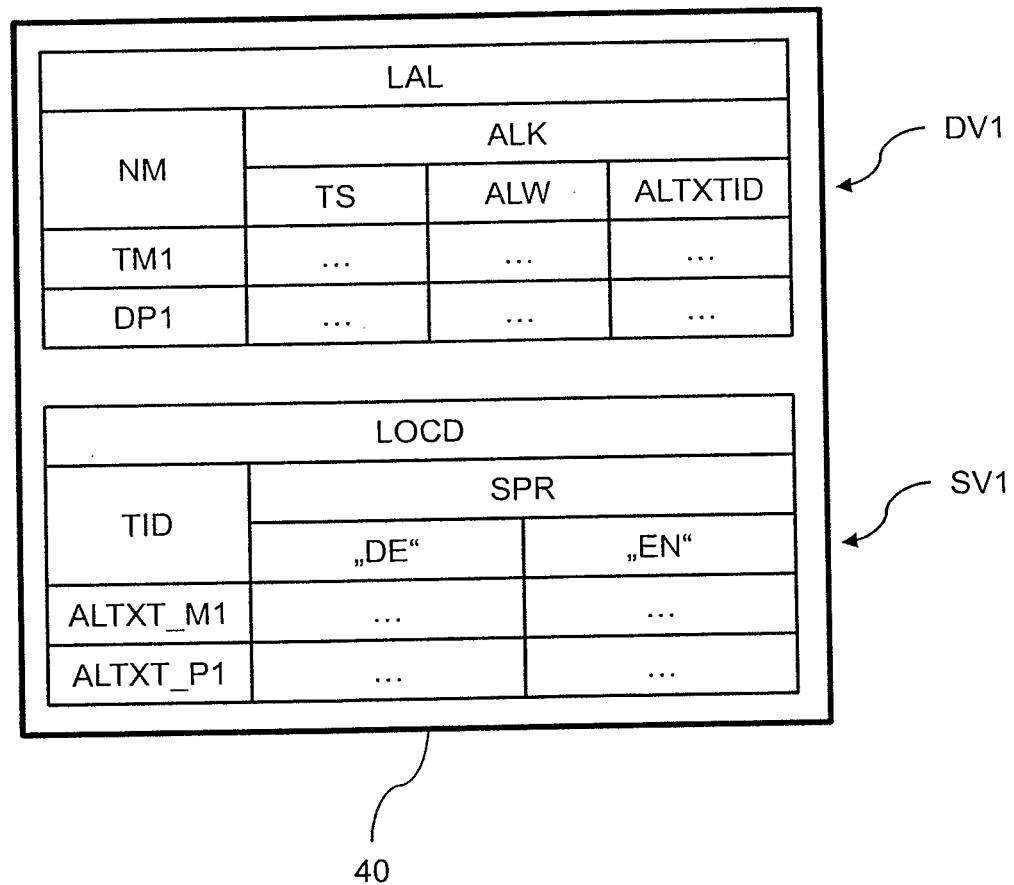
FIG. 5 shows an exemplary embodiment of the data content of the first and second control data in the first format.

FIG. 5 shows first control data SV1 and second control data DV1 contained on the data medium, which can be processed directly by the first control device. The last detected alarms LAL are stored in the dynamic second control data DV1. NM designates the name of the technical unit TM1, DP1 for which an alarm has been stored. ALK represents an alarm characteristic value which is composed of the time stamp TS, an alarm accompanying value ALW and an alarm text identifier ALTXTID. The alarms occur unpredictably and thus represent second control data DV1.

By contrast, localization data LOCD is regarded as static data and is thus to be counted as first control data SV1. In FIG. 5, the first control data SV1 is stored in the first format in accordance with FIG. 4. TID designates a text identification number, such as ALTXT_M1 and ALTXT_P1. The column SPR contains the available languages (here: "DE" and "EN") with respective alarm texts, such as "Temperatur am Motor 1 zu hoch" or "Temperature at motor 1 too high".

Figure 7:
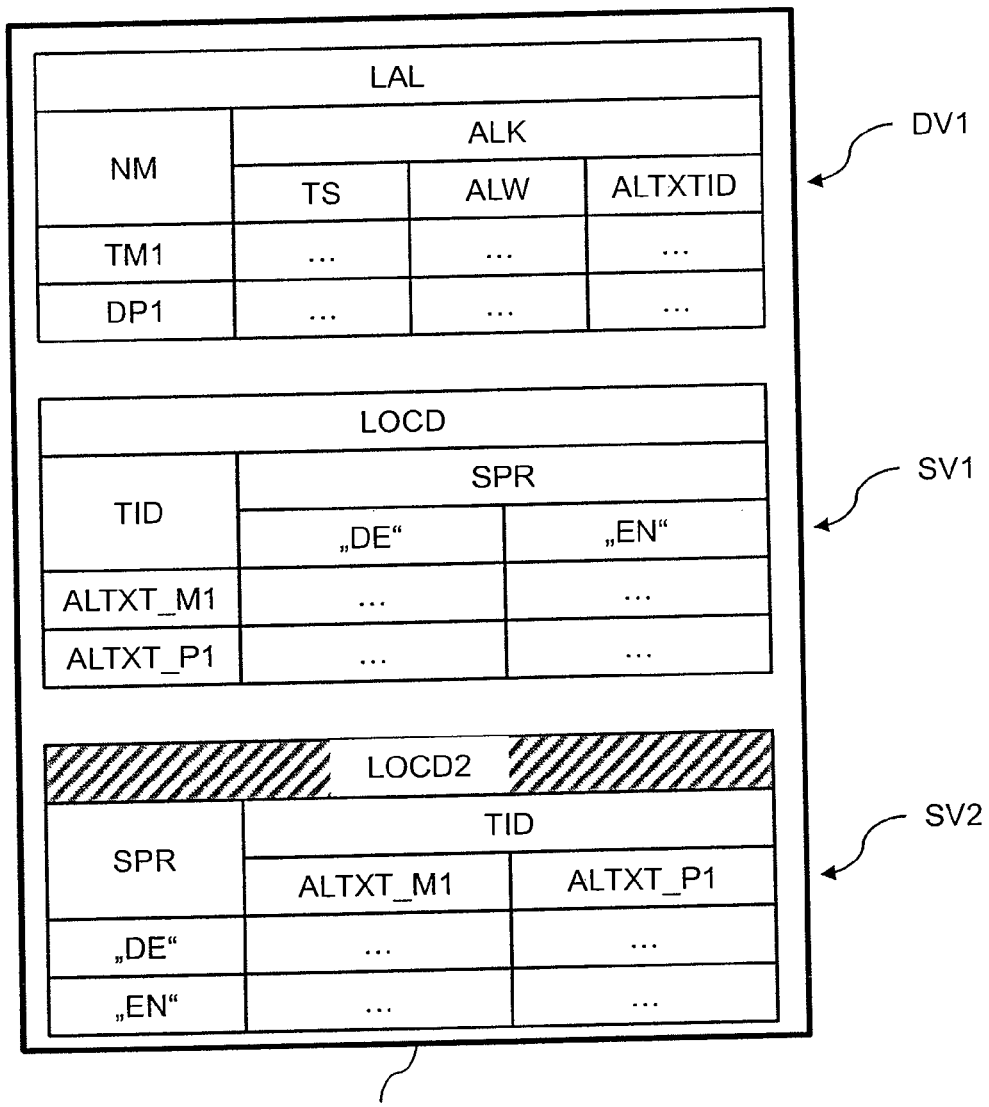
FIG. 7 shows an exemplary embodiment of the data content of the first control data in the first and the second format and of the second control data in the first format.

FIG. 7 shows the possible exemplary embodiment of the control data 40, after the first control data SV1 in the first format has been converted into the second format SV2 able to be processed by the second control device 20. The tables assigned to the first control data SV1 and the first control data DV1 correspond to the data shown in FIG. 5. In addition, the first control data SV3 converted into the second format is shown. The localization data of the first control data in the second format SV2 are overwritten with LOC2. In accordance with the structure shown in FIG. 6, the localization data is arranged based on the language SPR, where for example the languages "DE" and "EN" are shown. Each language is assigned a text identifier TID. The text identifier again comprises the alarm texts for different components of the technical system, here ALTXT_M1 and ALTXT_P1.

The second software SW2 of the second control device 20 uses the working copy during operation, i.e., the first control data SV2 in the second format, so that data contained in this table can be read without performance degradations. If the data medium, which then comprises the data structure in accordance with FIG. 7, is inserted into the first control device 10, then for access to the first control data, the control data SV1 in the first format is processed.

Figure 8:
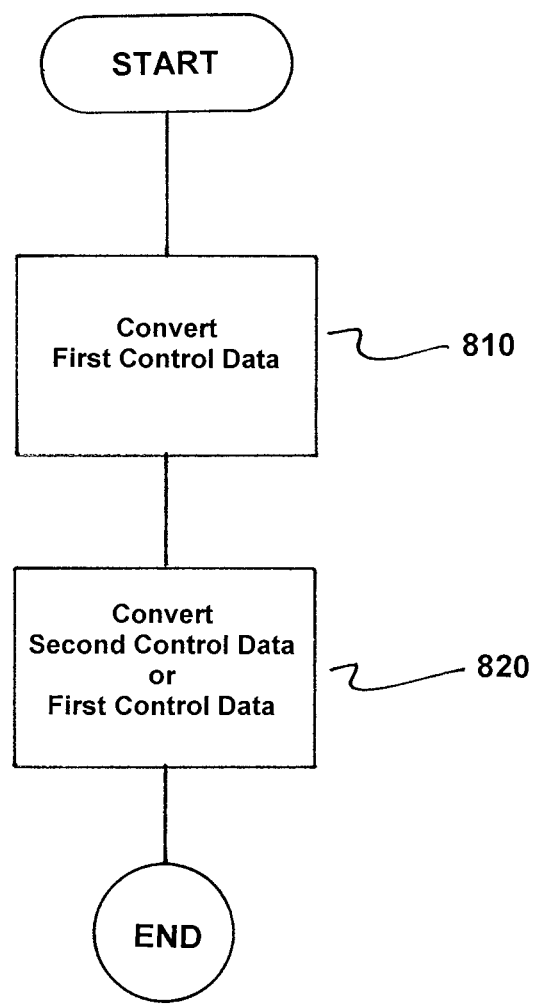
FIG. 8 is a flowchart of the method in accordance with the invention.

FIG. 8 is a flowchart of a method for operating a first or second control device provided to control a technical installation with control data stored on a data medium in a predetermined format, where the control data is stored on the data medium in a first format to permit direct reading and/or writing by the first control device, and where the control data comprises first and second control data. The method comprises converting the first control data into a second format during operation of the second control device such that the converted first control data can be processed directly by the second control device for at least read or write access, as indicated in step 810.

Next, either (i) the second control data for each access at run time from the first format into a format which can be processed by the second control device or (ii) the first control data for each access at run time is converted from the second format into a format that can be processed by the first control device, as indicated in step 820.

While there have been shown, described, pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE CHARACTERS

10 First control device
12 Read device of the first control device
20 Second control device
22 Read device of the third control device
30 Data medium
40 Control data
SV1 First control data in first format
DV1 Second control data in first format
SV2 First control data in second format
SW1 First software of the first control device
SW2 Second software of the second control device
KS2 Conversion layer of the second control device
L Read access
WR Write access
TID Text ID
SPR Language
TXT Text
LAL Last alarms
NM Name
ALK Alarm characteristic value
TS Time stamp
ALW Alarm accompanying value
ALTXTID Alarm text ID
TM1 Temperature of motor 1
PM1 Pressure of motor 1
LOCD Localization data of the first control data in first format
LOCD Localization data of the first control data in second format
ALTXT_M1 Alarm text for motor 1
ALTXT_P1 Alarm text for pump 1

What is claimed is:

1. A method for operating a first or second control device provided to control a technical installation with control data stored on a data medium in a predetermined format, the method comprising:

converting first control data into a second format during operation of the second control device such that the converted first control data can be processed directly by the second control device for read and write access without further intermediate processing steps, the control data being stored on the data medium in a first format to permit direct reading and direct writing by the first control device, the control data comprising the first and second control data; and converting (i) the second control data for each access at run time from the first format into a format which can be processed by the second control device and (ii) the first control data for each access at run time from the second format into a format which can be processed by the first control device.

2. The method as claimed in claim and 1, wherein the conversion of the first control data into the second format is performed once.

3. The method as claimed in claim 1, wherein the first control data converted into the second format is stored on the data medium.

4. The method as claimed in claim 2, wherein the first control data converted into the second format is stored on the data medium.

5. The method as claimed in claim 1, wherein the first control data converted into the second format is stored in addition to the first control data stored on the data medium in the first format.

6. The method as claimed in claim 1, wherein the first control data converted into the second format is stored in one of a different file, a different folder and a different memory area to the control data present in the first format.

7. The method as claimed in claim 1, wherein the first control data is converted by the second control device.

8. The method as claimed in claim 1, wherein the first and second control data are different types of data.

9. The method as claimed in claim 1, wherein the first control data comprises data which is predominantly accessed for reads during operation of the first and second control devices.

10. The method as claimed in claim 1, wherein the second control data comprises data dynamically changeable during operation of one of the first control device and the second control device.

11. The method as claimed in claim 1, wherein a write access to the first control data comprises writing the first control data present in the first and the second formats; and wherein the first control data present in the second format is written directly and the first control data present in the first format is written after performing a conversion from the format able to be processed by the second control device into the first format.

* * * * *